(12) United States Patent
Tobin et al.

(10) Patent No.: US 9,788,473 B2
(45) Date of Patent: Oct. 17, 2017

(54) PLANTING ASSEMBLY AND MACHINE

(71) Applicant: The Gusset Pty Ltd, Forbens (AU)

(72) Inventors: Noel Tobin, Sydney (AU); Joseph Moynihan, Sydney (AU)

(73) Assignee: The Gusset Pty Ltd, Forbens (AU)

( * ) Notice: Subject to any disclaimer, the term of this patent is extended or adjusted under 35 U.S.C. 154(b) by 67 days.

(21) Appl. No.: 14/783,546

(22) PCT Filed: Mar. 28, 2014

(86) PCT No.: PCT/AU2014/000338
§ 371 (c)(1),
(2) Date: Oct. 9, 2015

(87) PCT Pub. No.: WO2014/165897
PCT Pub. Date: Oct. 16, 2014

(65) Prior Publication Data
US 2016/0050841 A1    Feb. 25, 2016

(30) Foreign Application Priority Data

Apr. 11, 2013    (AU) ................................ 2013901238

(51) Int. Cl.
*A01C 7/20* (2006.01)
*A01B 61/04* (2006.01)
(Continued)

(52) U.S. Cl.
CPC ............ *A01C 5/064* (2013.01); *A01B 61/046* (2013.01); *A01B 63/24* (2013.01); *A01B 63/32* (2013.01); *A01C 7/128* (2013.01); *A01C 7/203* (2013.01)

(58) Field of Classification Search
CPC combination set(s) only.
See application file for complete search history.

(56) References Cited

U.S. PATENT DOCUMENTS 7,261,048 B1 *  8/2007  Hantke ................. A01B 63/32
                                              111/136
7,870,826 B2 *  1/2011  Bourgault ............. A01B 61/00
                                              111/195
(Continued)

FOREIGN PATENT DOCUMENTS

AU        537821 B2    7/1984
AU        567228 B2    11/1987
(Continued)

OTHER PUBLICATIONS

International Search Report issued in PCT/AU2014/000338 mailed on Apr. 22, 2014 (3 pages).
(Continued)

*Primary Examiner* — Alicia Torres
(74) *Attorney, Agent, or Firm* — Osha Liang LLP

(57) ABSTRACT

A planting machine for forming a trench for planting seeds and/or fertilizer in a ground surface, including a frame that supports a planting assembly having a cutting tool and a gauge that sets the height of the cutting tool so as to determine a depth of the trench formed by the tool, wherein the assembly includes a linkage coupled between the frame to the gauge and an actuator to allow for remote adjustment of the linkage, in order to vary a planting depth of the trench.

10 Claims, 13 Drawing Sheets

(51) Int. Cl.
    *A01B 63/24*     (2006.01)
    *A01B 63/32*     (2006.01)
    *A01C 5/06*     (2006.01)
    *A01C 7/12*     (2006.01)

(56) References Cited

U.S. PATENT DOCUMENTS

| | | | |
|---|---|---|---|
| 2008/0308020 A1* | 12/2008 | Ryder | A01C 7/203 |
| | | | 111/8 |
| 2011/0282556 A1* | 11/2011 | Klenz | A01C 7/203 |
| | | | 701/50 |
| 2011/0290165 A1* | 12/2011 | Lung | A01B 61/046 |
| | | | 111/153 |
| 2012/0186503 A1 | 7/2012 | Sauder et al. | |
| 2013/0032363 A1 | 2/2013 | Curry et al. | |

FOREIGN PATENT DOCUMENTS

| | | | |
|---|---|---|---|
| EP | 2005811 A2 | 12/2008 |
| FR | 2939599 A1 | 6/2010 |

OTHER PUBLICATIONS

Written Opinion of the International Searching Authority issued in PCT/AU2014/000338 mailed on Apr. 22, 2014 (5 pages).
International Preliminary Report on Patentability from PCT/AU2014/000338 mailed on Mar. 2, 2015 (13 pages).
Examination Report issued in corresponding Australian Application No. 2014252749; dated May 10, 2017 (3 pages).

\* cited by examiner

PLANTING ASSEMBLY AND MACHINE

FIELD OF THE INVENTION

The present invention relates to a planting assembly particularly, but not exclusively, a disc planting machine and assembly.

BACKGROUND OF THE INVENTION

A seeding assembly 1 is shown in FIG. 1 as including a cutting disc 2, a gauge wheel 3, a closing wheel 4 and a parallelogram coupling 5 for connecting the assembly 1 to a frame 6 of a seeding machine. In use, the cutting disc 2 cuts a trench in a ground surface to a depth determined by the gauge wheel 3 and seed is deposited into the trench before the trench is closed over by the closing wheel 4.

Adjustment of the depth of the trench may be required for different ground conditions or for different crops that need different planting depths.

For that purpose, a mechanism 7 is provided, that allows adjustment between the height and orientation of the gauge wheel 3 relative to the closing wheel 4, which in turn varies the height of the gauge wheel 3 relative to the disc 2, in order to vary a planting depth of the trench.

The mechanism shown in FIG. 1 needs manual adjustment and, in cases where a single planting machine includes a multitude of such assemblies, adjustment can take a considerable amount of time, up to a half or full day in some cases. Due to the time required, adjustment may be ignored entirely, which can result in seed being planted at a non-optimal depth.

OBJECT OF THE INVENTION

The present invention seeks to provide an alternative planting assembly and machine.

SUMMARY OF THE INVENTION

In accordance with the invention, there is provided a planting machine for forming a trench for planting seeds and/or fertilizer in a ground surface, including a frame that supports a planting assembly having a cutting tool and a gauge that sets the height of the cutting tool so as to determine a depth of the trench formed by the tool, wherein the assembly includes a linkage coupled between the frame to the gauge and an actuator to allow for remote adjustment of the linkage, in order to vary a planting depth of the trench.

Preferably, the gauge and tool are mounted to the frame with a parallelogram coupling and the linkage is mounted directly to the coupling and adapted to raise and lower the gauge relative to the coupling.

Preferably, the linkage is pivotally mounted to the coupling to move in unison with the coupling.

Preferably, the linkage forms a pantograph connector to match movement between the linkage and the coupling.

Preferably, the gauge and tool are mounted on an arm that is pivotally connected to the frame.

Preferably, the gauge is in the form of a ground engaging gauge wheel offset from the tool along the extent of the arm, wherein the linkage is coupled to the arm to lift and lower the arm to thereby modify the relative height between the gauge wheel and the tool.

Preferably, the tool is in the form of a disc and the planting assembly includes a delivery boot positioned adjacent the disc, for depositing seed or fertilizer in the trench cut by the disc. Alternatively, the tool is of any other suitable construction such as in the form of a tine, point, point sweep combination of disc, tine, point and/or point sweep.

Preferably, the machine includes a plurality of planting assemblies, each with a respective tool, gauge, linkage and actuator, wherein various ones of the actuators are mechanically linked to operate in unison.

Preferably, the planting assemblies are arranged in a series of ranks, positioned one behind the other, the ranks being mechanically connected with fore and aft extending links, pivotally connected to each of the respective actuators.

Preferably, multiple planting assemblies are provided in each rank and lateral links couple the actuators of each rank to the associated fore and aft extending links.

Preferably, the machine includes a hydraulic cylinder for driving the links in a fore and aft direction, wherein the cylinder is arranged to be remotely controlled from a cabin of a vehicle towing the planting machine.

Preferably, the machine includes a plurality of frames, each with multiple planting assemblies, as described above, arrayed across a width of the machine.

Preferably, the machine includes multiple phased cylinders for adjusting the planting depth of each of the assemblies in unison.

BRIEF DESCRIPTION OF THE DRAWINGS

The invention is described, by way of non-limiting example only, with reference to the accompanying drawings, in which.

DETAILED DESCRIPTION OF THE DRAWINGS

Figure 1:
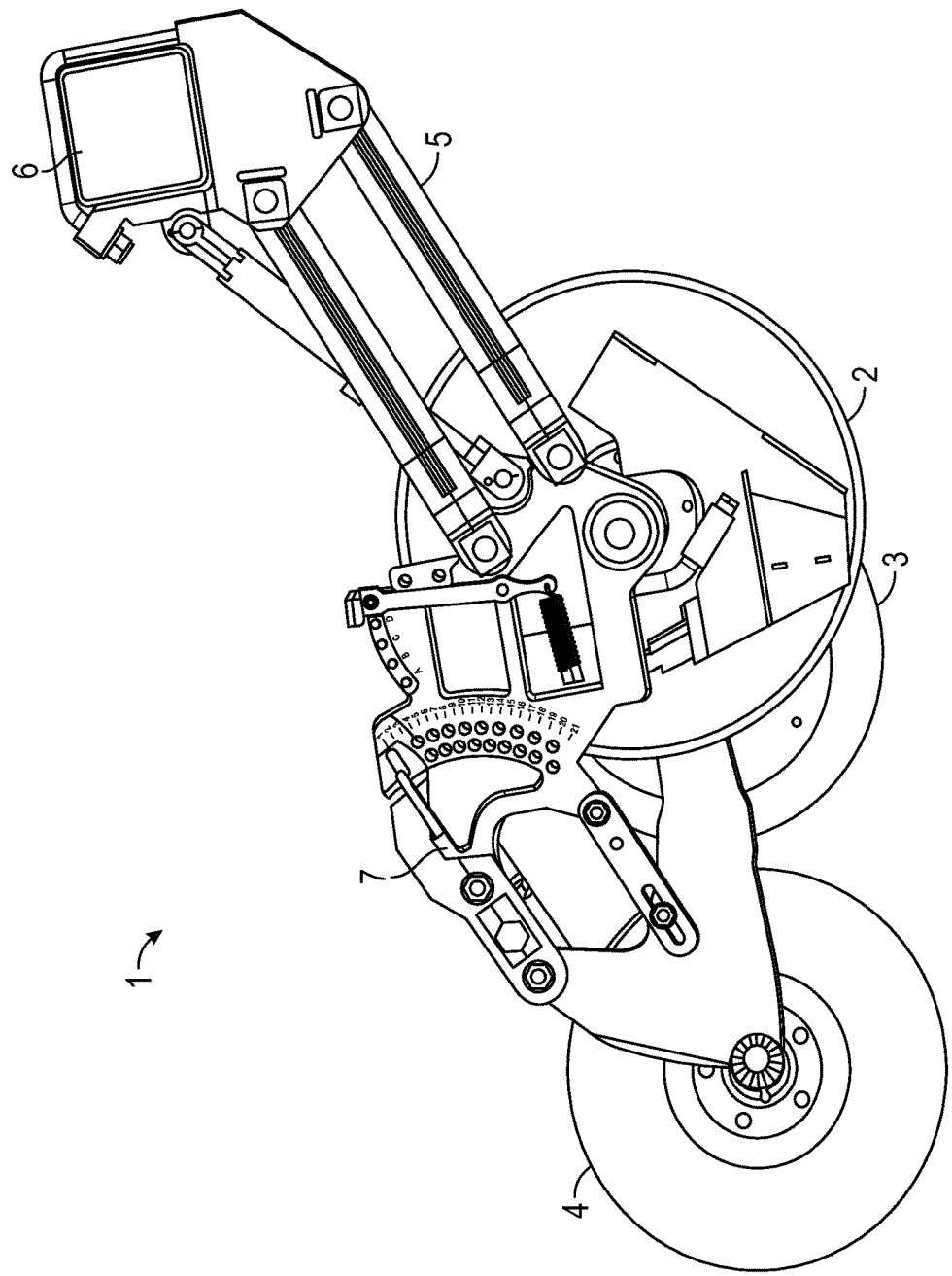
FIG. 1 is a side view of a prior art seeding assembly.
Figure 2:
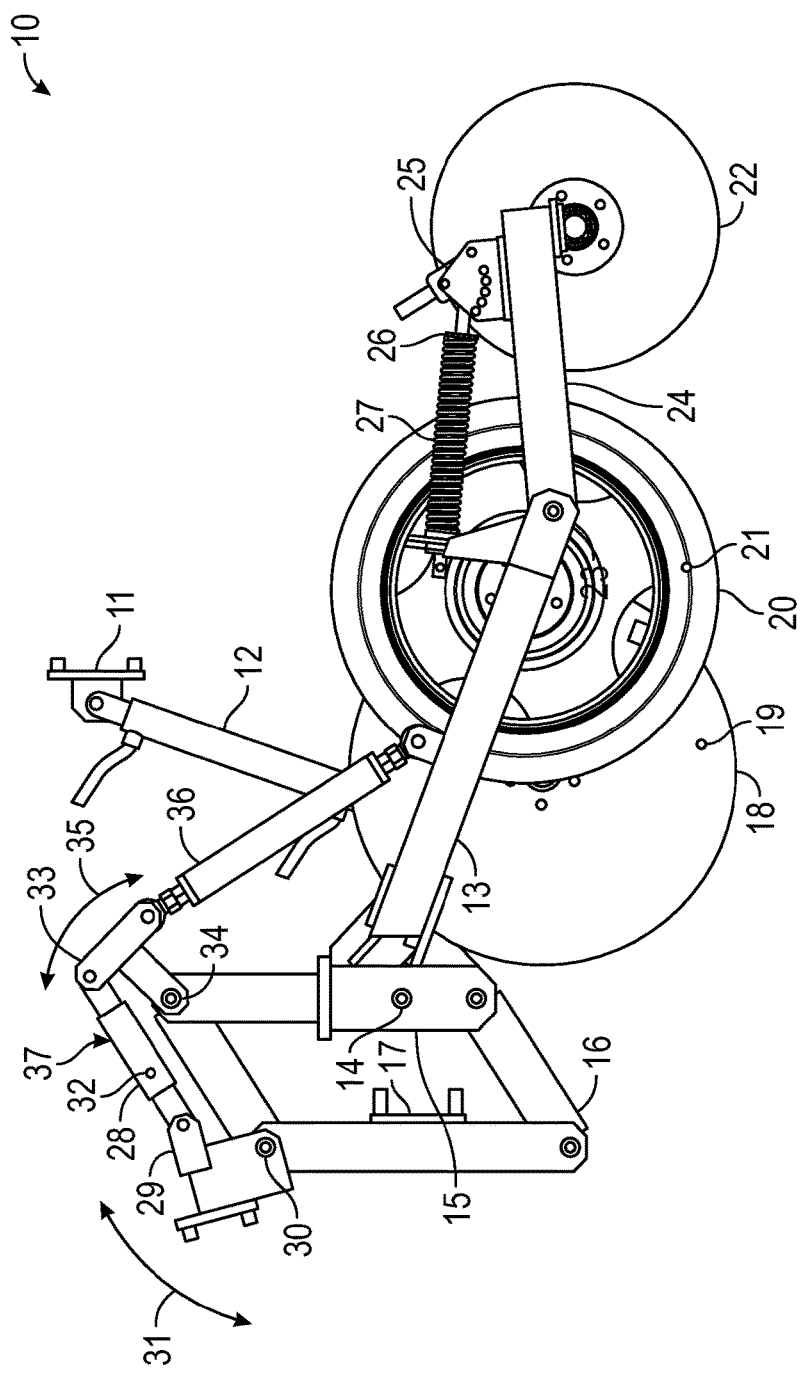
FIG. 2 is a side view of a planting machine.

Referring to FIG. 2, a planting assembly 10 is shown connected to a mounting face 11 of a frame of a planting machine (shown in later Figures) by a cylinder 12. The assembly 10 includes an arm 13 mounted at a pivot point 14 to a connecting section 15 of a parallelogram coupling 16. The coupling 16 has a mounting face 17, also for connection to the frame of the planting machine (not shown).

Figure 5:
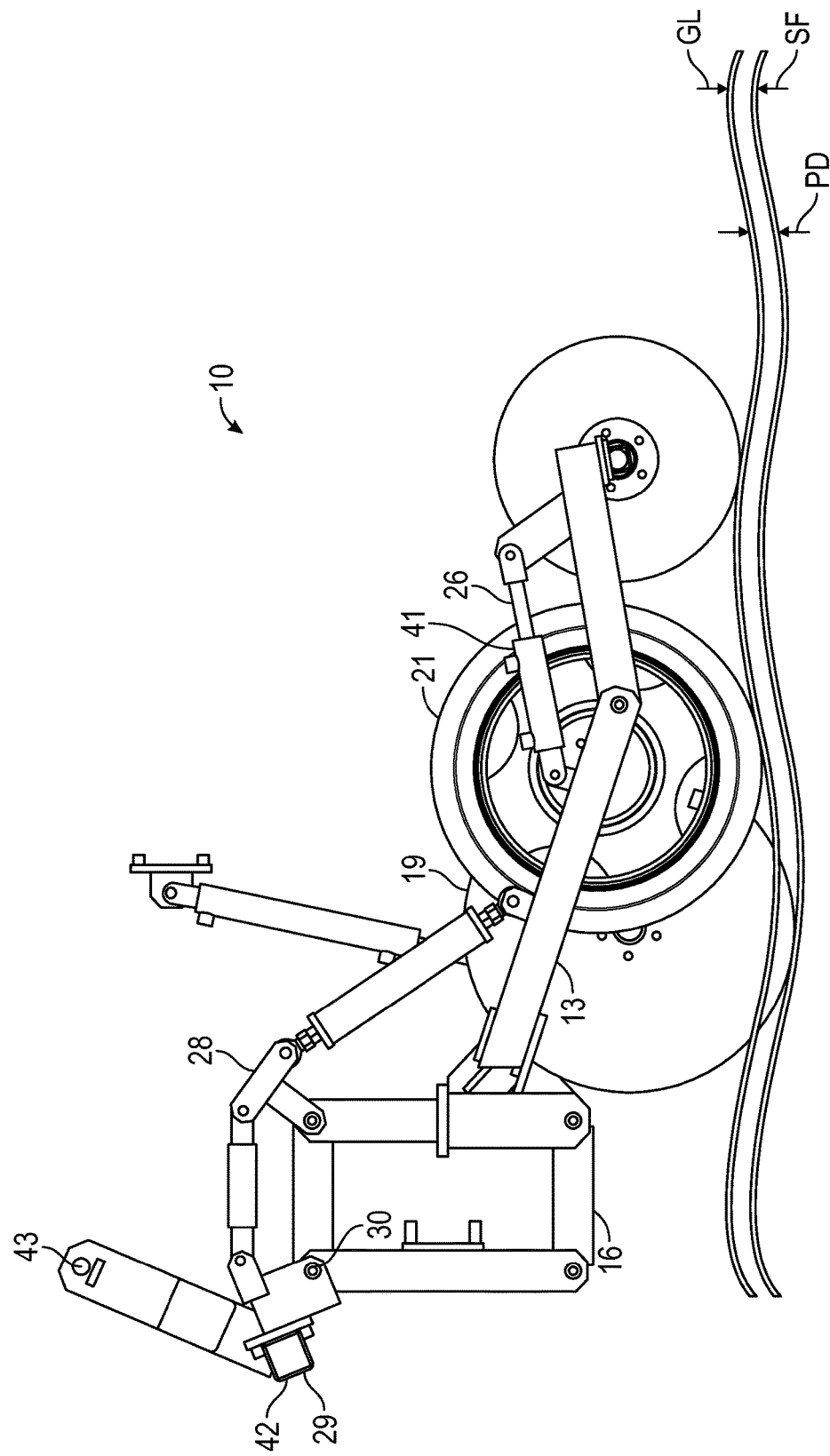
FIG. 5 is a side view of the machine with a press wheel biasing mechanism in the form of a cylinder.
Figure 6:
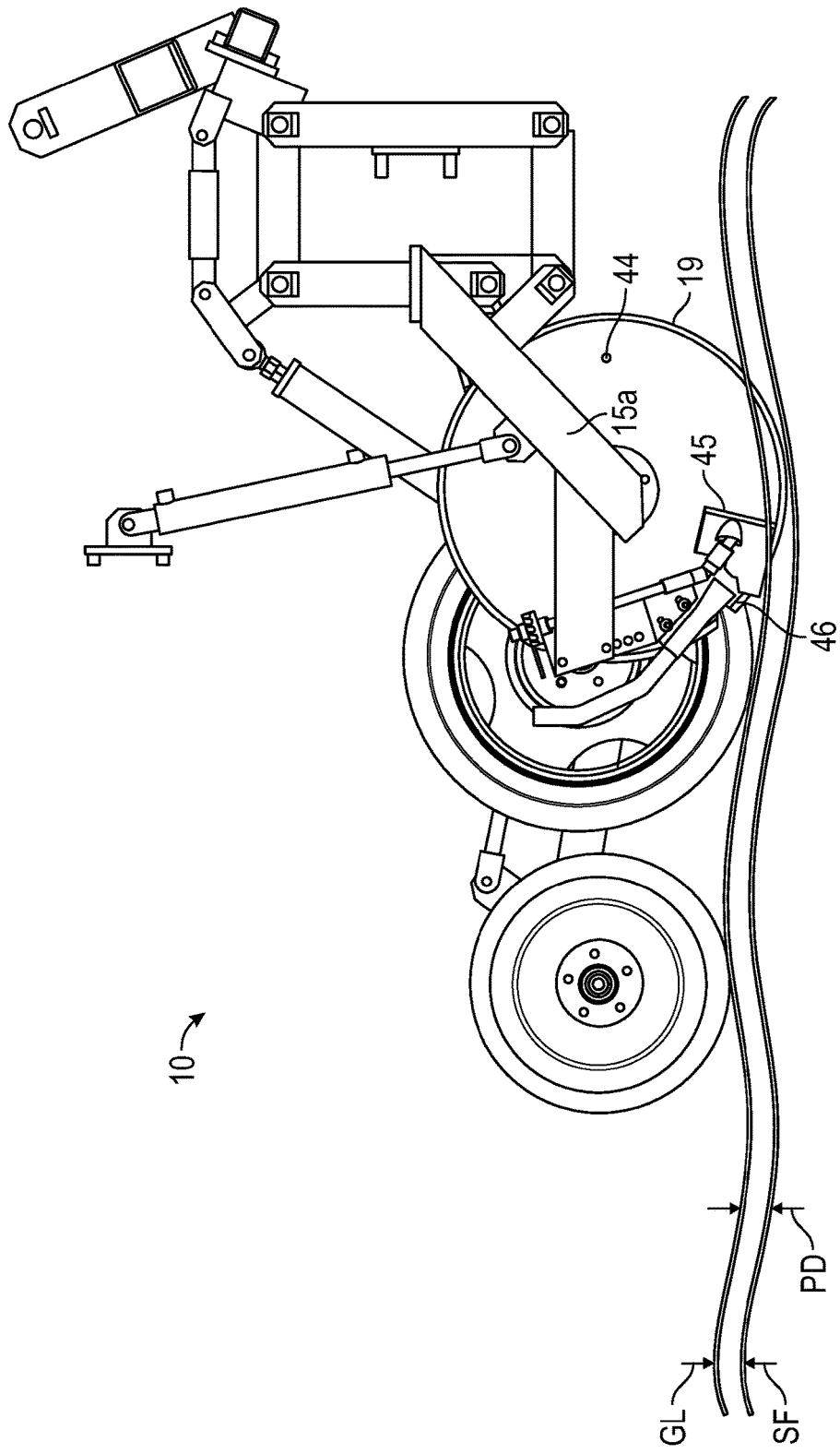
FIG. 6 is a view of the machine from an opposite side.

A cutting tool 18 in the form of a disc 19 is fixed to the connecting section 15 by a connecting arm 15*a* (see FIG. 6). The arm 13 carries a gauge 20 in the form of gauge wheel 21. The arm 13 also supports a closing wheel 22 at a remote end 23 of the arm 13. The closing wheel 22 is carried by a secondary arm 24 that has an adjustment mechanism 25 and biasing device 26 in the form of a spring 27. The biasing device 26 can instead be in the form of a hydraulic cylinder (as shown in FIG. 5) or an equivalent.

A linkage 28 is pivotally mounted to the coupling 16 and is connected between the arm 13 and an actuator 29 that is pivotally connected to a main pivot 30 of the coupling 16 to rotate as shown by arrows 31. The linkage 28 includes a first member 32 that extends between the actuator 29 and a second junction member 33 that is pivotally mounted at a top pivot point 34, to rotate as shown by arrows 35. The junction member 33 is in turn connected to a third member 36 that is pivotally mounted to the arm 13.

The linkage 28 forms a second parallelogram or pantograph 37 on top of the coupling 16 so as to move in unison with the coupling 16.

Figure 3:
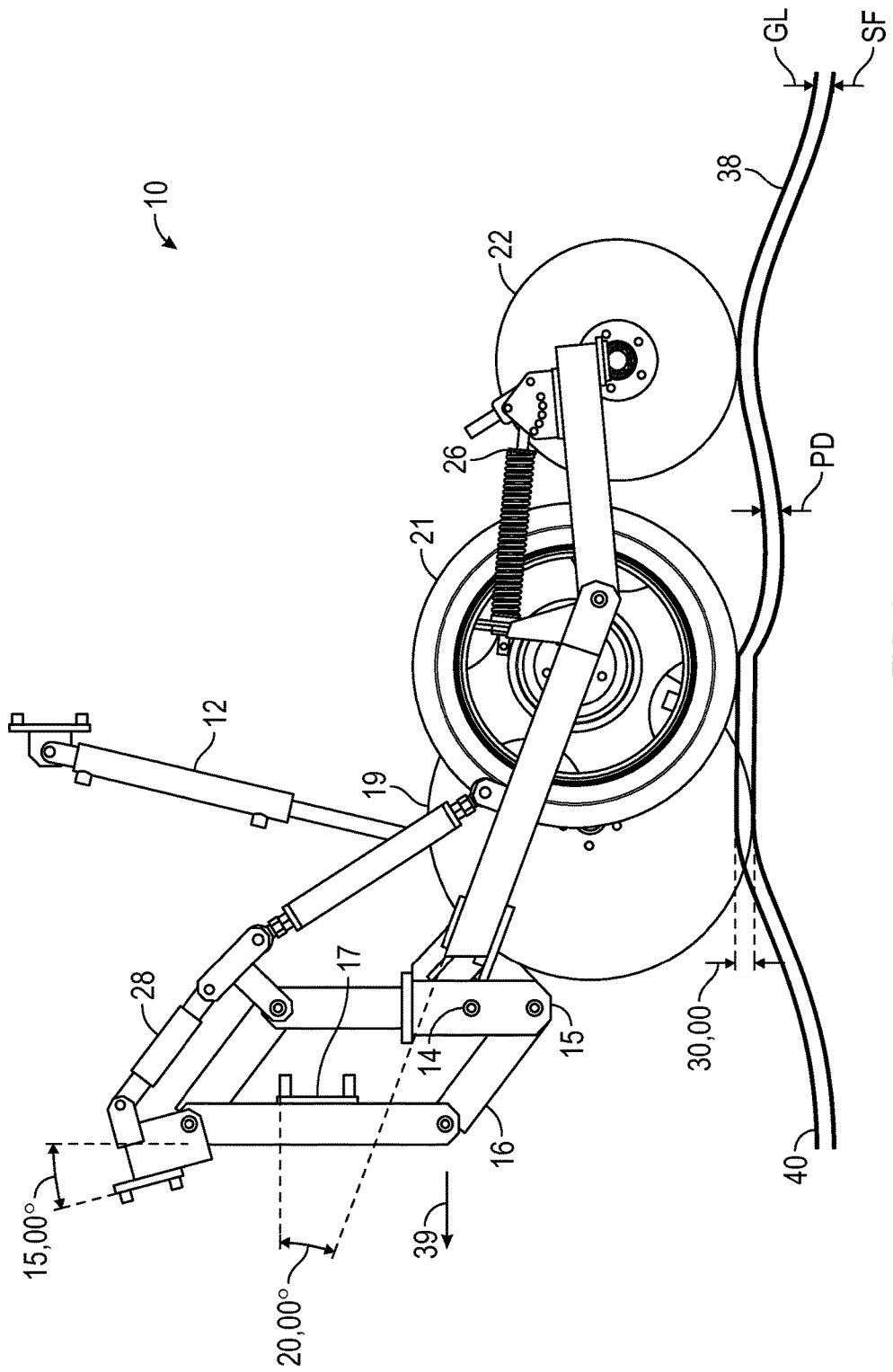
FIG. 3 is a side view of the machine of FIG. 2 with a planting assembly in a downward position.

Referring now to FIG. 3, the assembly 10 is shown travelling over a ground surface 38 in a direction indicated by arrow 39. The gauge wheel 21 travels on top of the ground surface 38 and the disc 19 is set to cut a trench to a particular depth for planting seed or fertilizer. In the example shown, the planting depth (PD) is 30 mm.

The gauge wheel 21 is designed to follow the ground surface 38 so that the planting depth PD remains substantially constant as the assembly 10 travels over surface contours 40. The cylinder 12 acts to hold the assembly 10 down against the ground surface 38 during a seeding operation. The biasing device 26 serves to force the closing wheel 22 against the ground surface 38 to ensure the trench formed by the cutting disc 19 is closed and packed after seeding.

FIG. 3 shows the assembly 10 in a downward position from that shown in FIG. 2, relative to the mounting face 17. The downward position of the disc 19 and gauge wheel 21 is accommodated by the coupling 16 shifting the pivot point 14 downward, while maintaining a set arm angle relative to the connecting section 15 of the coupling 16 of, for example, 20 degrees. As can be seen, the linkage 28 has moved to a downward position in unison with the coupling 16.

Figure 4:
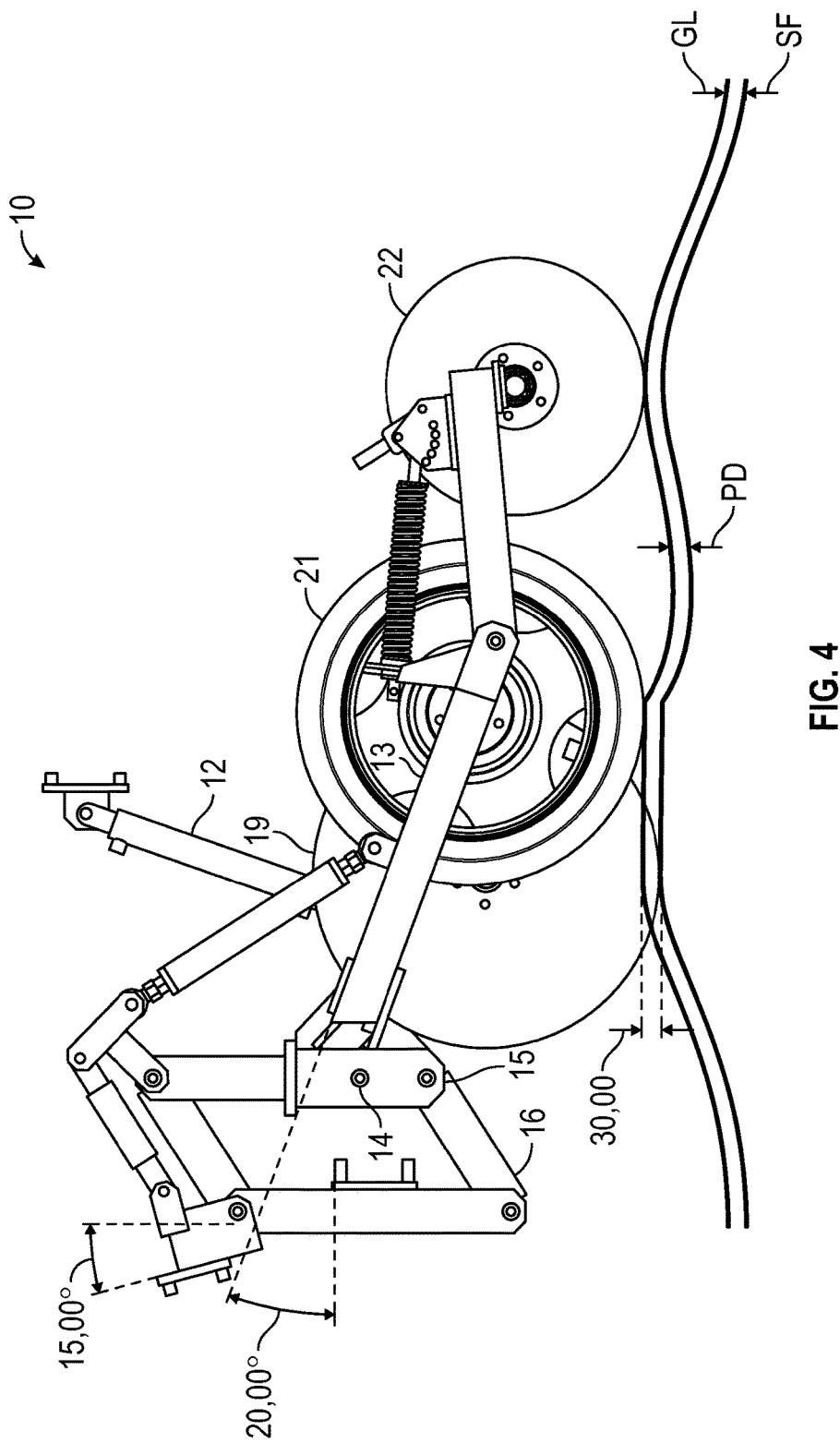
FIG. 4 is a side view of the machine with the planting assembly in an upward position.

Referring now to FIG. 4, the assembly 10 is in an upward position, where the coupling 16 accommodates a higher position of the arm 13 by allowing the pivot point 14 to be raised relative to the mounting face 17, while maintaining the angle of the arm 13 relative to the connecting section 15, to ensure the planting depth remains constant, despite the assembly 10 being elevated from the position shown in FIG. 3.

Referring to FIG. 5, the assembly 10 is in a levelled position. In this example, the biasing device 26 is in the form of a hydraulic cylinder 41 that replaces the functionality of both the spring 27 and the adjustment mechanism 25, for ease of operation.

In FIG. 5, the actuator 29 is also shown connected to a lateral link 42 that allows for remote actuation by a lever 43. The lever 43 can be moved to rotate the actuator 29 about the main pivot 30 so as to change the orientation of the arm 13 relative to the coupling 16, via the linkage 28.

By lifting or lowering the arm 13 using the linkage 28, the relative height of the gauge wheel 21 and disc 19 is changed and this has the effect of adjusting the planting depth. As such, the planting depth of the assembly 10 can be adjusted remotely of the assembly 10, via the actuator 29.

Referring now to FIG. 6, a reverse or lee side 44 of the assembly 10 is shown where a scraper blade 45, for deflecting dirt and debris away from the disc 19, is illustrated. FIG. 6 also shows a boot 46 through which seed or fertilizer is fed into a trench as the assembly 10 is moved to the right, as shown.

Figure 7:
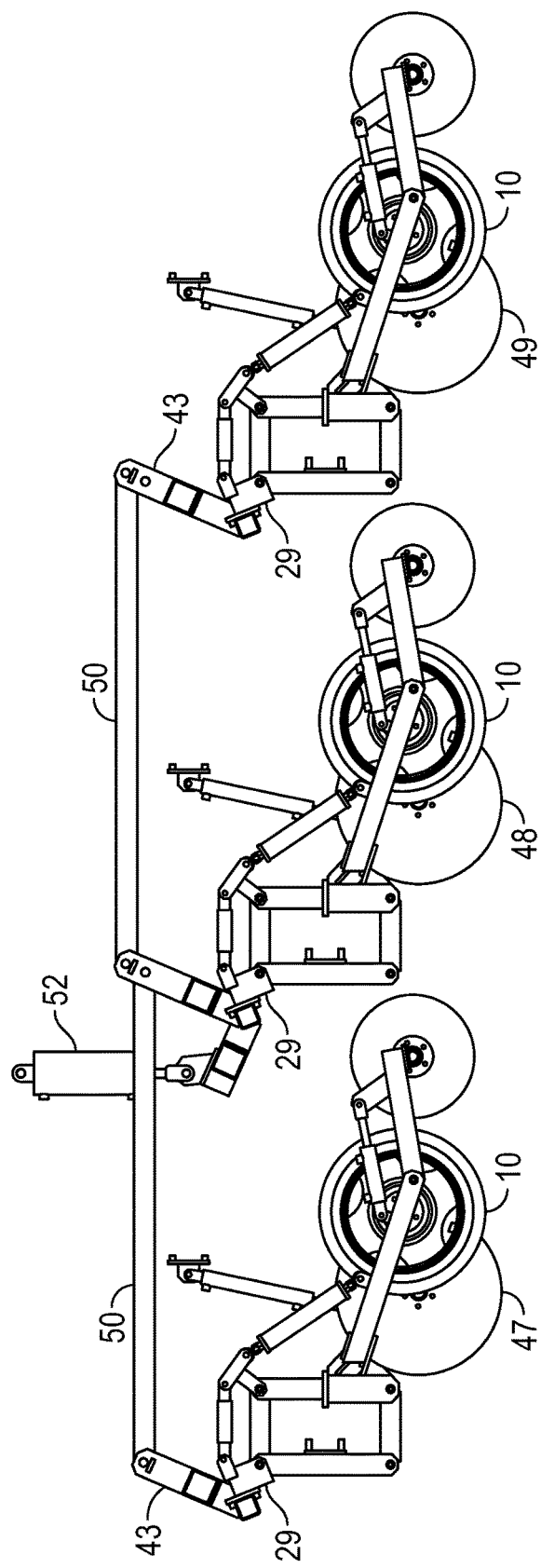
FIG. 7 is a side view of the machine with a series of ranks or planter assemblies.

Referring now to FIG. 7, a plurality of planting assemblies 10 is shown, with the planting assemblies 10 arranged in a series of ranks 47, 48, 49, with the associated actuator 29 of each assembly 10 being pivotally connected by fore and aft extending links 50, via the respective lever 43. The links 50 are coupled via a connector 51 to a hydraulic cylinder 52 that drives the links 50, in unison, in the fore and aft direction. As such, the planting depth of all the assemblies 10 can be adjusted simultaneously by the one cylinder 52.

Figure 8:
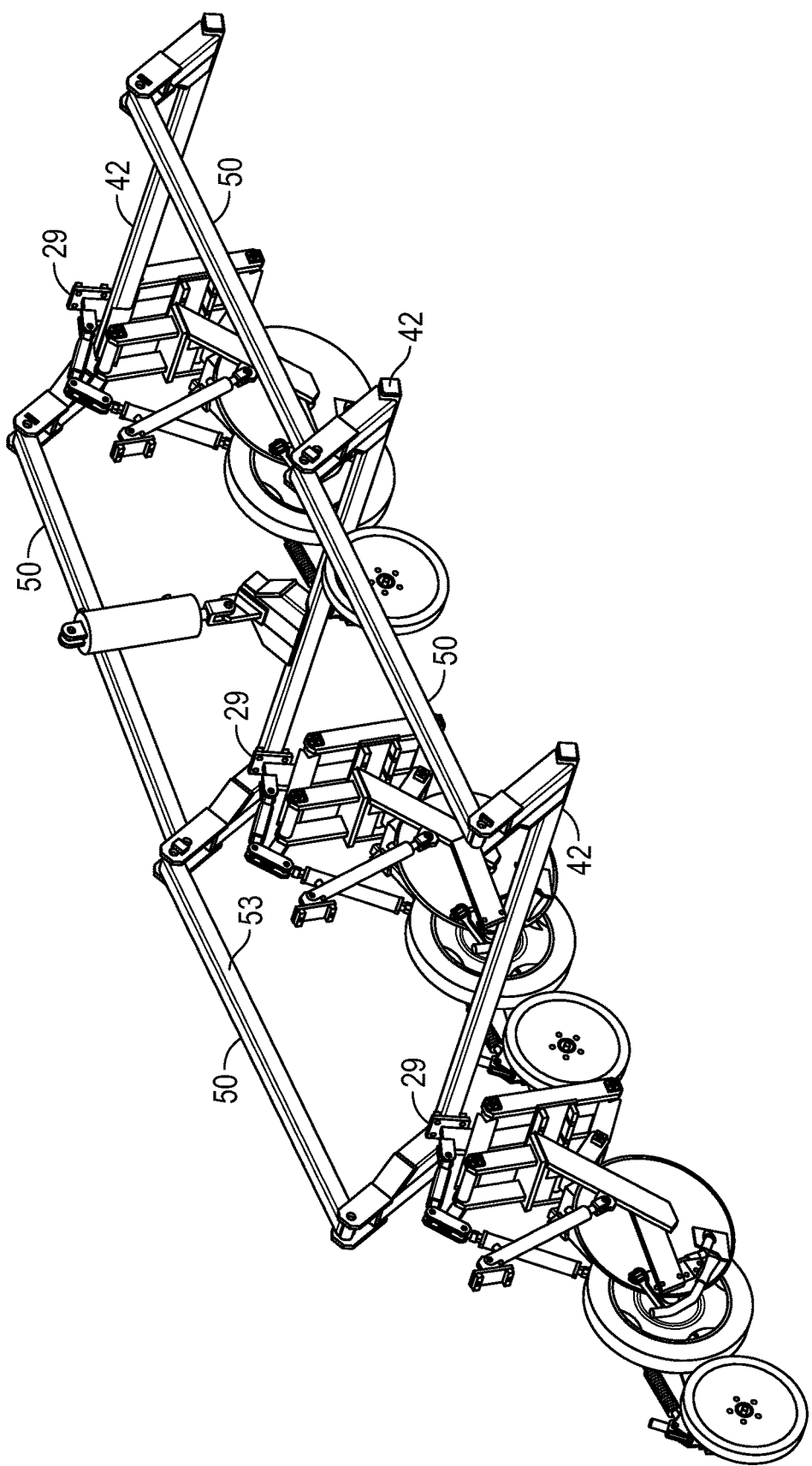
FIG. 8 is a perspective view of the arrangement of ranks within a first frame structure of the machine.

Referring to FIG. 8, a first frame structure 53 is shown, where the links 50 are arranged in a tandem configuration, connected to the respective actuators 29 by the lateral links 42.

Figure 9:
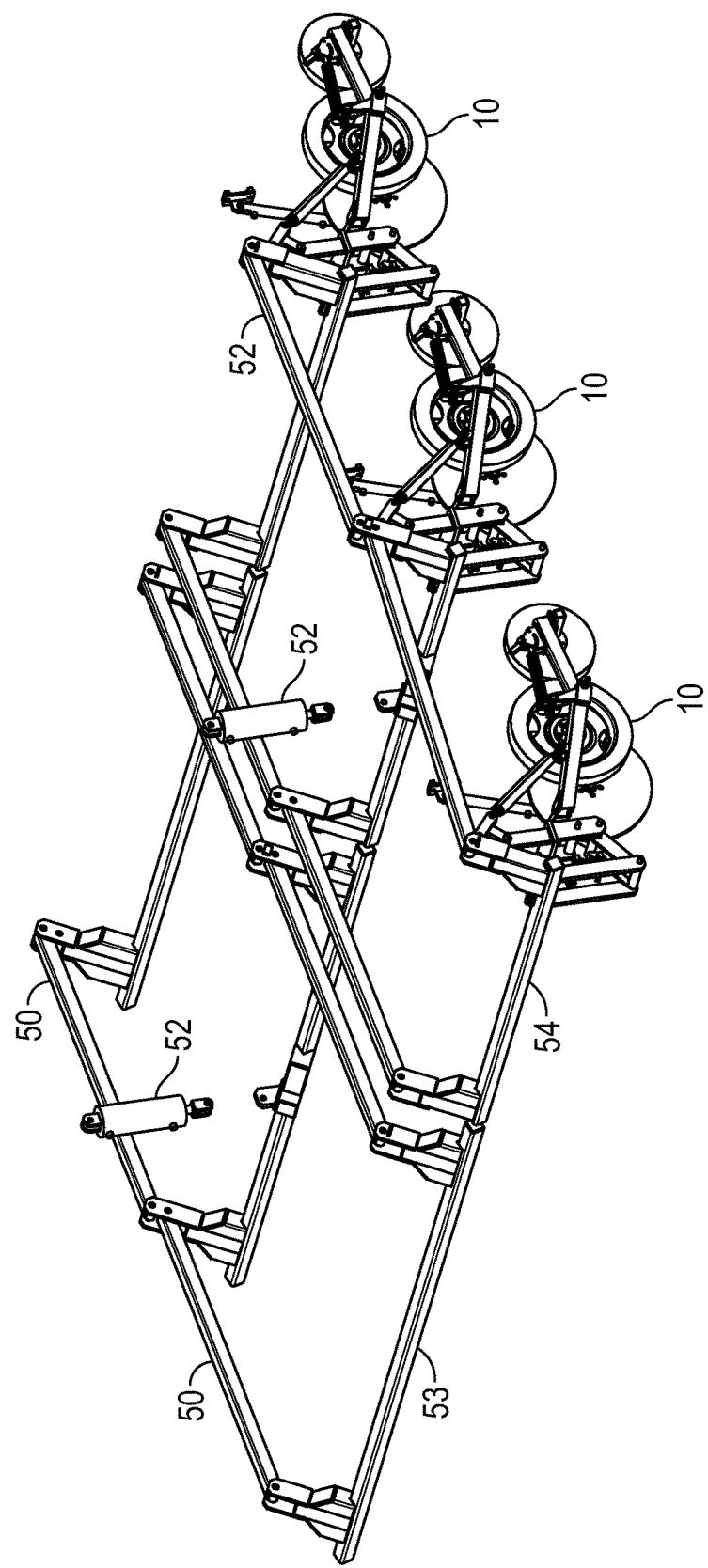
FIG. 9 illustrates a second frame structure of the machine.

With reference to FIG. 9, the assemblies 10 have been removed from the first frame structure 53 for clarity, while another set of assemblies 10 is shown fitted in a second frame structure 54 arranged adjacent the first frame structure 53. The second frame structure 54 also includes a cylinder 52 to drive the associated fore and aft links 50 in a fore and aft direction. The cylinders 52 are phased so that the links 50 in each frame structure 53, 54 can be driven in unison.

Figure 10:
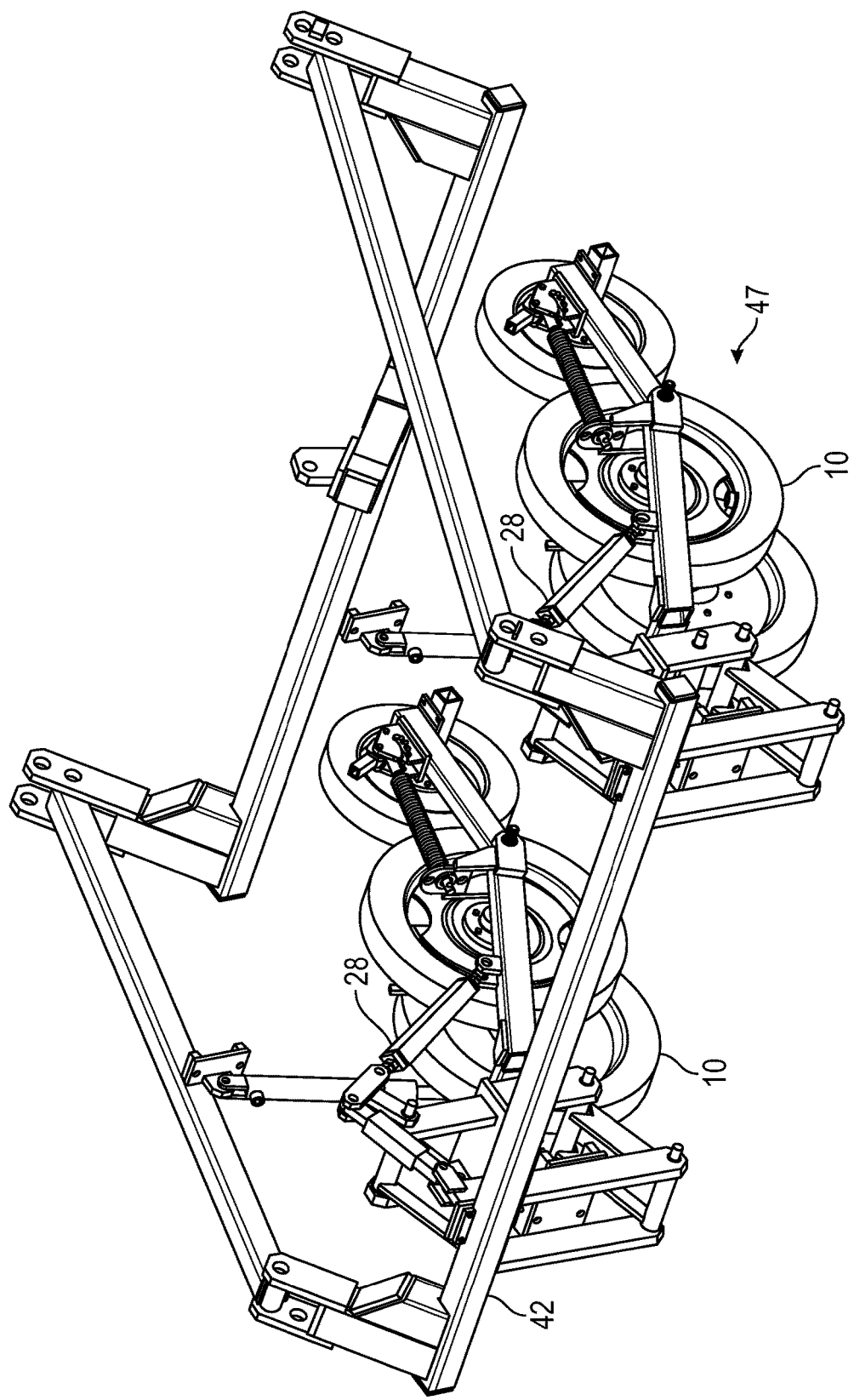
FIG. 10 is a perspective view illustrating multiple planting assemblies in one of the ranks of the machine.

With reference to FIG. 10, the rank 47 is shown as including multiple planting assemblies 10, connected to the lateral link 42 so that the linkage 28 of each assembly 10 can be actuated simultaneously and in unison. Multiple planting assemblies 10 are preferably provided in each of the ranks 47, 48, 49.

Figure 11:
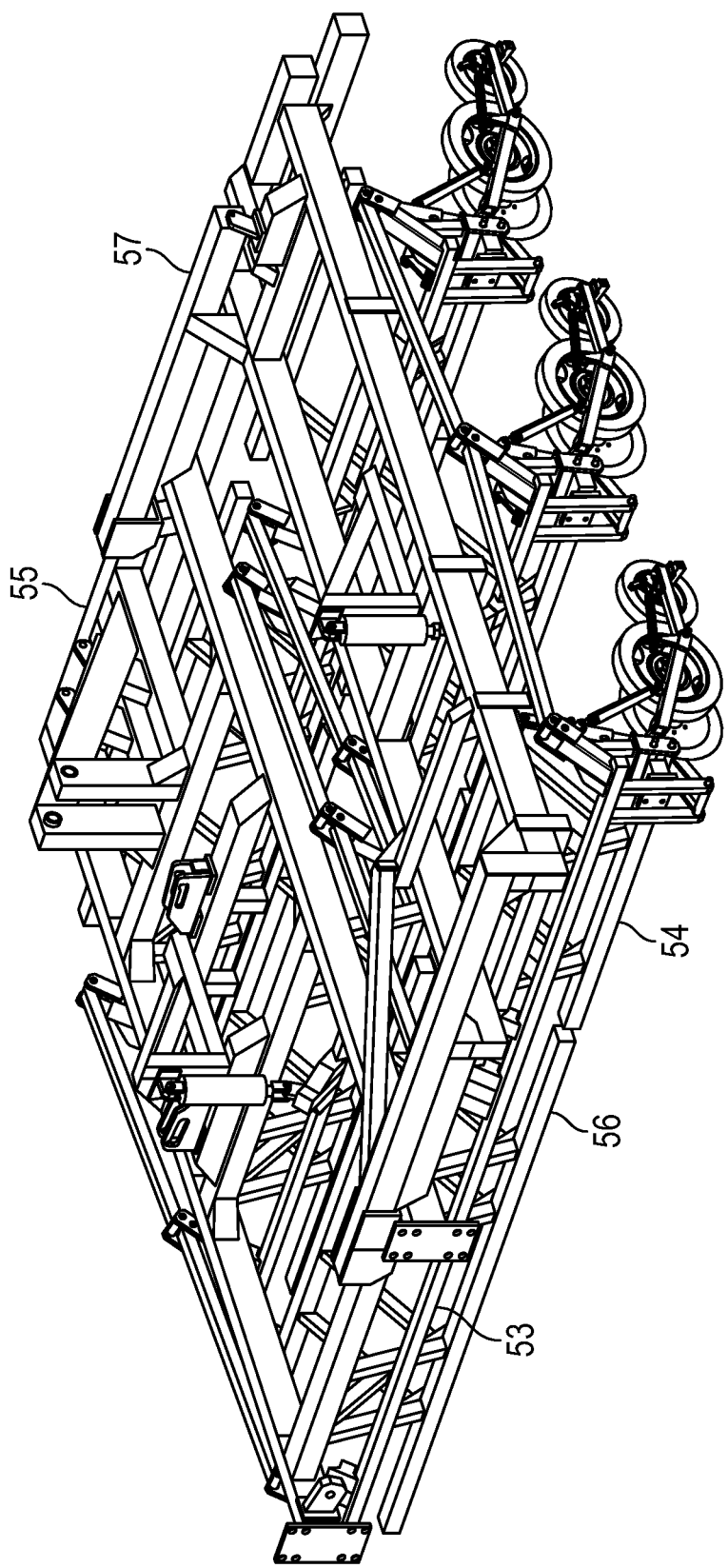
FIG. 11 is a perspective view showing a plurality of frames of the machine.

With reference to FIG. 11, the first frame structure 53 is shown integrated into a centre frame 55 of a planting machine 56. The second frame structure 54 is integrated into a wing frame 57 of the machine 56.

Figure 12:
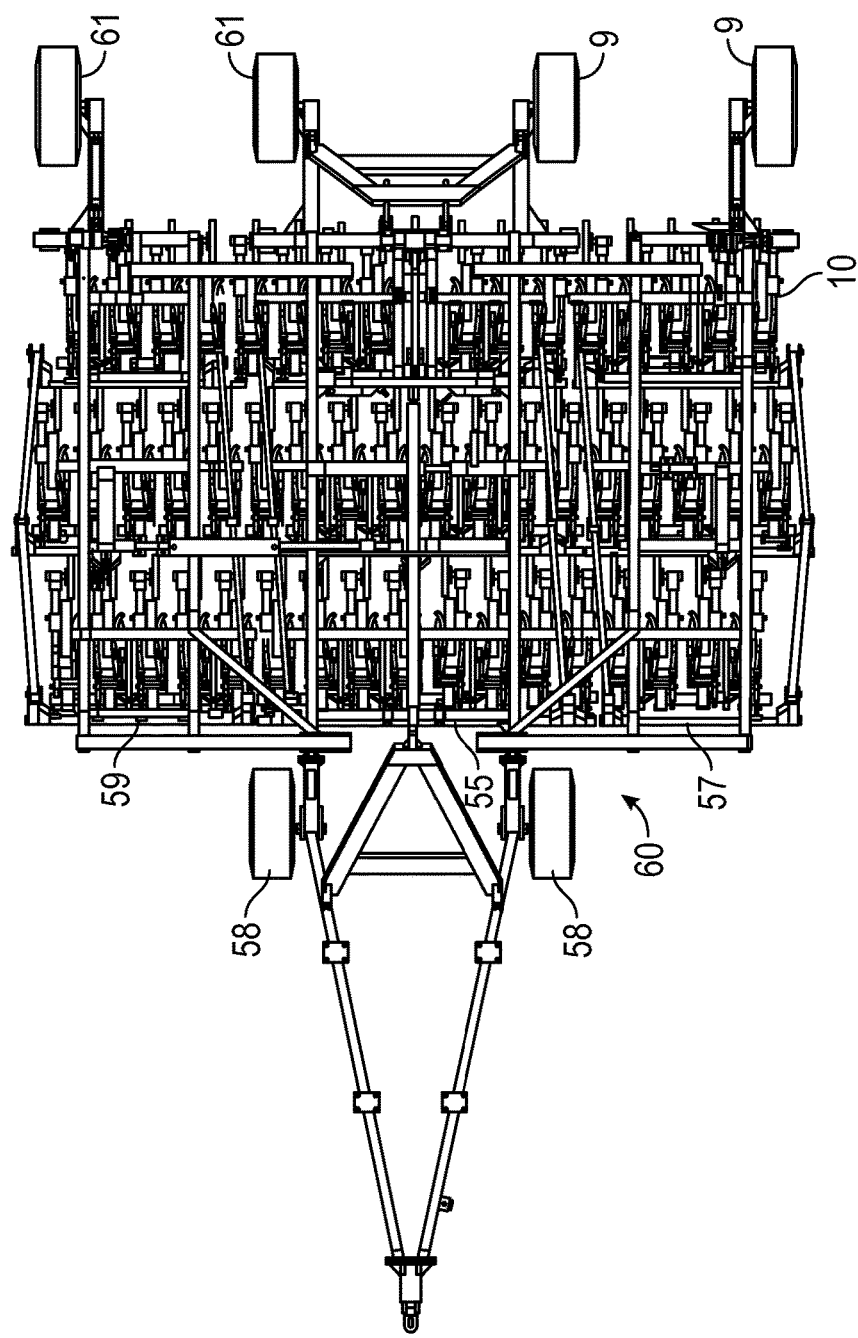
FIG. 12 is a plan view of a plurality of frames.
Figure 13:
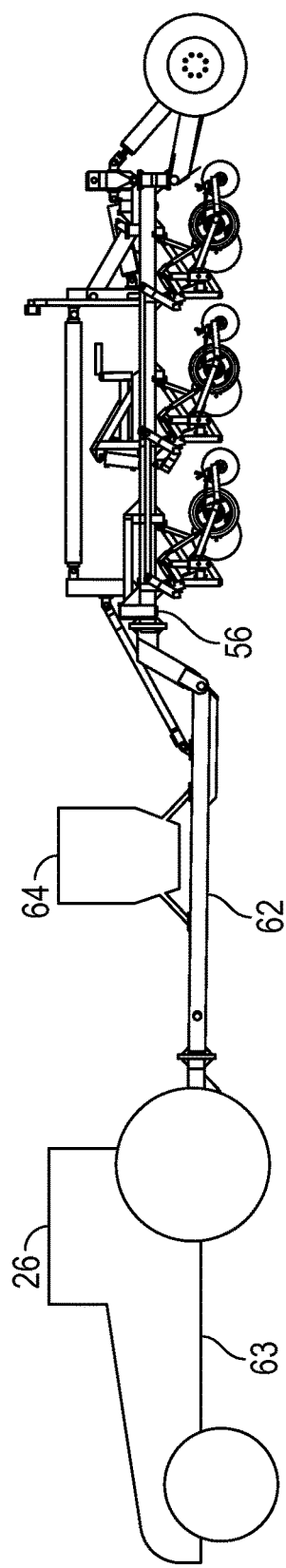
FIG. 13 is a diagrammatic side view of a vehicle towing the machine.

In FIG. 12, another wing frame 59 is shown on an opposite side of the centre frame 55. Each frame 55, 57 and 59 is fitted with an array 60 of planting assemblies 10 across a width and length of the machine 56. The frames 55, 57, 59 are supported on transport wheels 61 although the wheels 61 may be omitted and the frames 55, 57, 59 may instead be self-supporting and not require transport wheels 61 and/or additional wheels 58 may be provided at a front of the machine 56. In either case, a draw bar 62 is provided to connect the machine 56 to a towing vehicle 63, as shown in FIG. 13, which also illustrates a seed bin 64 on top of the draw bar 62.

As may be appreciated, the phased cylinders 52 can be used to control the planting depth of each of the assemblies 10 remotely and the cylinders 52 themselves can all be operated remotely from a cabin 65 of the vehicle 63 to allow for rapid and uniform adjustment of all of the gauge wheels 21 simultaneously, thus providing a significant time and labour saving, as compared to using the prior art adjustment mechanism that requires each assembly to be adjusted manually and independently.

The invention has been described by way of non-limiting example only and many modifications and variations can be made without departing from the spirit and scope of the invention. For example, instead of a disc 19, the cutting tool 18 may instead be replaced by one or a combination of a tine, a point and a point sweep, as required.

LIST OF PARTS

1. Seeding assembly
2. Cutting disc
3. Gauge wheel
4. Closing wheel
5. Parallelogram coupling 6. Frame
7. Mechanism
8.
9.
10. Planting assembly
11. Mounting face
12. Cylinder
13. Arm
14. Pivot point
15. Connecting section
15a Connecting arm
16. Parallelogram coupling
17. Mounting face
18. Cutting tool
19. Disc
20. Gauge
21. Gauge wheel
22. Closing wheel
23. End
24. Secondary arm
25. Adjustment mechanism
26. Biasing device
27. Spring
28. Linkage
29. Actuator
30. Main pivot
31. Arrows
32. First member
33. Second member
34. Top pivot point
35. Arrows
36. Third member
37. Second parallelogram/pantograph
38. Ground surface
39. Arrow
40. Surface contours
41. Cylinder
42. Lateral link
43. Lever
44. Side
45. Scraper
46. Boot
47. Rank
48. Rank
49. Rank
50. Links
51. Connector
52. Cylinder
53. First frame structure
54. Second frame structure
55. Centre frame
56. Planting machine
57. Wing frame
58. Wheels
59. Wing frame
60. Array
61. Wheels
62. Draw bar
63. Towing vehicle
64. Seed bin
65. Cabin

The invention claimed is:

1. A planting machine for forming a trench for planting seeds and/or fertilizer in a ground surface, comprising:
a frame that supports a planting assembly having a cutting tool and a gauge that sets the height of the cutting tool so as to determine a depth of the trench formed by the tool,
wherein the planting assembly includes a linkage coupled between the frame and the gauge and an actuator to allow for remote adjustment of the linkage, in order to vary a planting depth of the trench,
wherein the gauge and the cutting tool are mounted to the frame with a parallelogram coupling and the linkage is mounted directly to the parallelogram coupling and adapted to raise and lower the gauge relative to the parallelogram coupling,
wherein the machine includes a plurality of planting assemblies, each with a respective tool, gauge, linkage and actuator, wherein various ones of the actuators are mechanically linked to operate in unison, and
wherein the planting assemblies are arranged in a series of ranks, positioned one behind the other, the ranks being mechanically connected with fore and aft extending links, pivotally connected to each of the respective actuators.

2. The planting machine of claim 1, wherein the linkage is pivotally mounted to the coupling to move in unison with the coupling.

3. The planting machine of claim 2, wherein the linkage forms a pantograph connector to match movement between the linkage and the coupling.

4. The planting machine of claim 1, wherein the gauge and tool are mounted to a connecting section of the parallelogram coupling, with the cutting tool being fixed to the connecting section by a connecting arm and the gauge being pivotally mounted to the connecting section by a pivoting arm and wherein the linkage is coupled to the pivoting arm so that rotation of the actuator changes the orientation of the arm relative to the coupling, via the linkage, to lift and lower the arm to thereby change the relative height of the gauge and cutting tool in order to adjust the planting depth.

5. The planting machine of claim 4, wherein the gauge is in the form of a ground engaging gauge wheel offset from the tool along the extent of the arm, wherein the linkage is coupled to the arm to lift and lower the arm to thereby modify the relative height between the gauge wheel and the tool.

6. The planting machine of claim 1, wherein the planting assembly further includes a delivery boot positioned adjacent the cutting tool, for depositing seed or fertilizer in the trench cut by the cutting tool and wherein the cutting tool is in the form of one or a combination of a disc, tine, point or point sweep.

7. The planting machine of claim 1, wherein multiple planting assemblies are provided in each rank and lateral links couple the actuators of each rank to the associated fore and aft extending links.

8. The planting machine of claim 1, wherein the machine includes a hydraulic cylinder for driving the fore and aft extending links in a fore and aft direction, wherein the cylinder is arranged to be remotely controlled from a cabin of a vehicle towing the planting machine.

9. The planting machine of claim 1, including a plurality of frames across the width of the machine and an associated set of multiple planting assemblies for each frame.

10. The planting machine of claim 1, further including multiple phased cylinders for adjusting the planting depth of each of the assemblies in unison.

* * * * *